United States Patent
Miura

(10) Patent No.: US 6,953,112 B2
(45) Date of Patent: Oct. 11, 2005

(54) ONE-WAY CLUTCH

(75) Inventor: Yoshihisa Miura, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/630,981

(22) Filed: Jul. 31, 2003

(65) Prior Publication Data

US 2004/0074730 A1 Apr. 22, 2004

(30) Foreign Application Priority Data

Aug. 1, 2002 (JP) ..................................... P. 2002-224689

(51) Int. Cl.⁷ ............................................. F16D 41/07
(52) U.S. Cl. ..................................... 192/45.1; 192/41 A
(58) Field of Search .............................. 192/45.1, 41 A; 188/82.8

(56) References Cited

U.S. PATENT DOCUMENTS

| | | | | |
|---|---|---|---|---|
| 2,750,019 A | * | 6/1956 | Ferris ........................ | 192/45.1 |
| 2,753,027 A | * | 7/1956 | Troendly et al. ........... | 192/45.1 |
| 4,252,221 A | * | 2/1981 | Lanzerath et al. ......... | 192/41 A |
| 4,766,987 A | * | 8/1988 | Message .................... | 192/41 A |
| 5,002,167 A | * | 3/1991 | Kinoshita et al. ......... | 192/41 A |
| 5,469,949 A | * | 11/1995 | Leitz ........................... | 192/45.1 |
| 6,892,868 B2 | * | 5/2005 | Miura et al. ............... | 192/45.1 |
| 2003/0006114 A1 | * | 1/2003 | Miura et al. ............... | 192/45.1 |

FOREIGN PATENT DOCUMENTS

| | | |
|---|---|---|
| JP | 6-10233 | 3/1994 |
| JP | 2653040 | 5/1997 |
| JP | 2598500 | 6/1999 |

* cited by examiner

Primary Examiner—Rodney H. Bonck
(74) Attorney, Agent, or Firm—McGinn IP Law Group, PLLC

(57) ABSTRACT

The present invention provides a one-way clutch in which spring force of tongue pieces of a spring will not be decreased, even in case where a larger tightening margin is provided between a cage and an outer race, but proper spring force can be maintained thereby to attain reliable synchronization between the outer race and the cage, and a rise of cost will not be incurred. The one-way clutch includes a cage, a spring arranged along an inner diameter side of the cage, and a sprag assembly. Each of sprag is inserted into pockets of the spring and cage, respectively. One end of the spring is overlapped with the other end at a position where the largest repulsive force is exerted from the cage. Thereby, rigidity of the spring is increased in a part of the spring corresponding to the position.

16 Claims, 10 Drawing Sheets

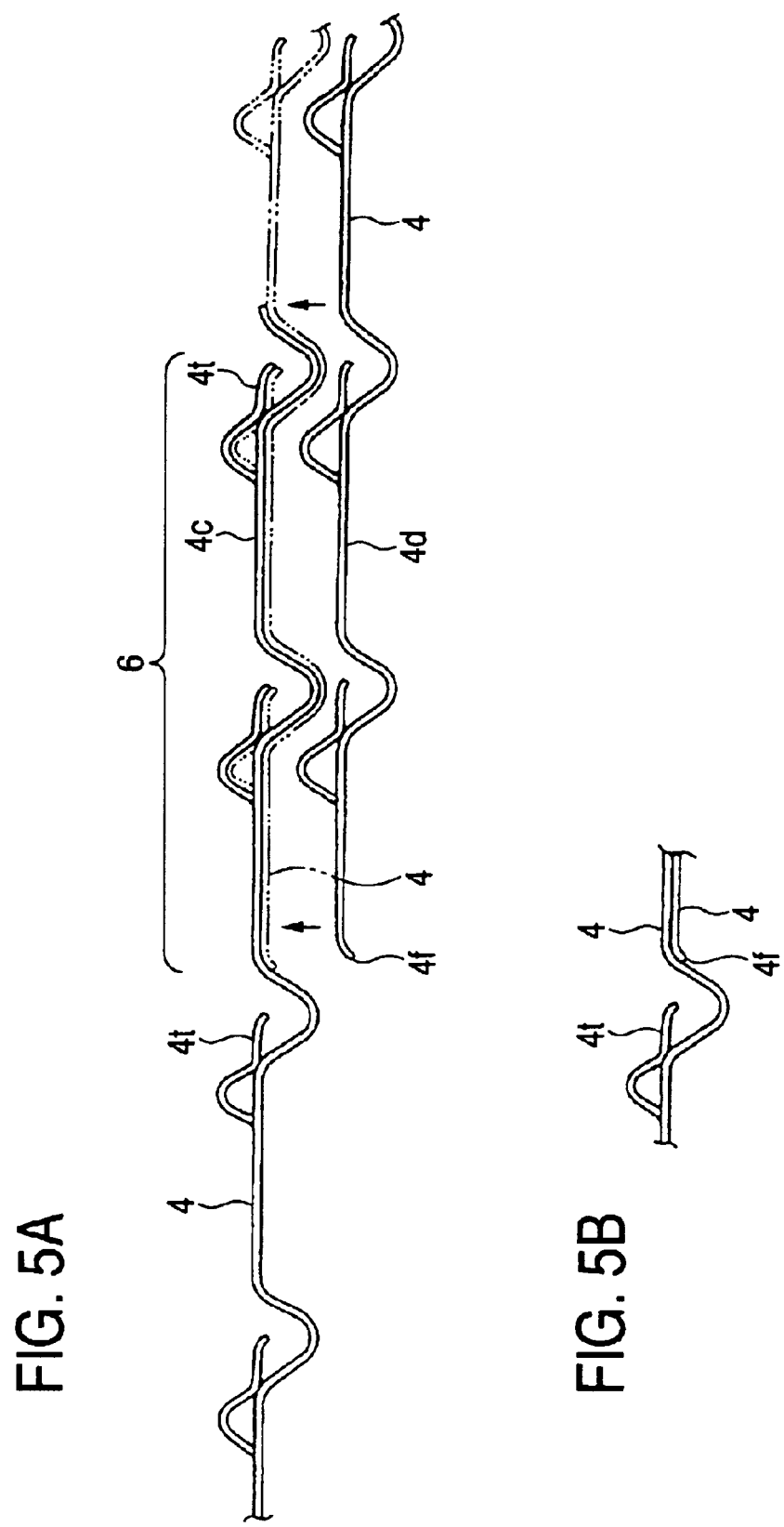

ONE-WAY CLUTCH

BACKGROUND OF THE INVENTION

1. Field of the Invention

The present invention relates to a one-way clutch provided with a spring along an inner circumference of a cage, and more particularly, to the one-way clutch in which sprags can be properly urged without damaging the spring, even though an irregular repulsive force is applied to the sprags when the cage is press fitted into an outer race.

2. Description of the Related Art

Generally, in order to repeatedly conduct transmission and interruption of an engine power between an inner race and an outer race, a one-way clutch is provided between these inner race and outer race.

FIG. 6 shows a conventional one-way clutch including a cage 23 having a flange portion 23f, a spring 24, and a plurality of sprags 25. In the one-way clutch of this type, the cage 23 is often provided with a tightening margin when it is press fitted into an outer race (not shown), for the purpose of synchronously rotating the cage 23 and the outer race. For this reason, the one-way clutch is designed in such a manner that an outer diameter of the cage 23 (an outer diameter of the flange portion 23f) may be somewhat larger than an inner diameter of a track face of the outer race so as to give retaining force, when the cage is press fitted to the outer race. However, there has been a problem that the cage 23 may become off-center with s respect to the outer race due to a pressure when it is press fitted to the inner peripheral face of the outer race, and clearances between the sprags 25 and respective pockets of the cage 23 may become narrow. Under the circumstances, in order to avoid such phenomenon, it has been proposed that the flange portion 23f of the cage 23 is cut at an equal interval in a circumferential direction to form cut-outs 23c (Japanese Utility Model Registration No. 2598500). Alternatively, there has been disclosed a structure in which a cage having a somewhat elliptical shape is press fitted into an outer race so that the outer race and the cage may be integrally rotated (Japanese Utility Model Publication No. JP-B-6-10233U).

Further, it often happens in the one-way clutch that a distance of a space between the outer race and the inner race may vary in size, due to misalignment. Specifically, in case where there is a large distance between an inner peripheral face of the outer race and an outer peripheral face of the inner race, recovering force from tongue pieces of the spring will be decreased, and in case where there is a small distance between the inner peripheral face of the outer race and the outer peripheral face of the inner race, the recovering force from the tongue pieces of the spring will be increased. Such variation of the recovering force may lead to difficulty in synchronous operation of the sprags on occasion of torque transmission, and in order to overcome this difficulty, an example of the one-way clutch as shown in FIG. 7 has been proposed. Specifically, this one-way clutch includes a cage 13, a spring 14 (usually, a ribbon spring is employed) and a plurality of sprags 15, and disposed in an annular space 20 between an outer race 11 and an inner race 12 When the one-way clutch is rotated in one direction along with relative rotation of the outer race 11 and the inner race 12 on occasion of power transmission, the sprags 15 function as wedges allowing the outer race 11 and the inner race 12 to rotate integrally (locked). On the other hand, when the one-way clutch is rotated in the reverse direction, the wedge function will be released to put the one-way clutch into an idle rotation, and transmission of the power will be interrupted (unlocked). This one-way clutch is characterized in that a value of a length L of an arm after variation which is represented by a distance between a function line of a recovering force F acting at a tongue piece 14t and a perpendicular line from an edge 14a of a pocket 14p abutted against the sprag 15 as a pivotal center is set so as to be in a reciprocal proportion to a value of the recovering force F after variation caused by misalignment in a locked or a free state of the sprag 15 (Japanese Patent No. 2653040).

Generally, in the one-way clutch, a spring 34 is provided on an inner diameter side of a cage 33 which holds sprags 35, and the sprags 35 are always urged into a locked state by means of tongue pieces 34t of the spring 34, as shown in FIG. 8 and FIG. 9 which is a view as seen in a direction of arrows A—A in FIG. 8. However, when the cage 33 whose one part (around an upper part in FIG. 6) is formed in a somewhat elliptical shape in order to rotate the cage 33 synchronously with the outer race is press fitted to an inner peripheral face (a track face) 1a of the outer race 1, the spring 34 will be locally deformed toward a center in a radial direction to a large extent, especially due to a repulsive force when the elliptical part is press fitted. Consequently, as shown in FIG. 10 which is a view as seen in a direction of arrows B—B in FIG. 9, urging force of the tongue pieces 34t of the spring 34 exerted on the sprags 35 which have been preloaded by the tongue pieces 34t of the spring 34 will be decreased, and at a position where the spring has been largely deformed, an inclined posture of the sprags 35 will be promoted to come into an idle rotation. As the results, there has been such a problem that on occasion of shifting from the idle rotation to an engaged position, an count of deformation of the tongue pieces 34t of the spring may be increased, and the tongue pieces 34t will be liable to be damaged, thus causing a defective engagement of the one-way clutch.

SUMMARY OF THE INVENTION

The present invention has been made in order to solve the above described problem, and an object of the invention is to provide a one-way clutch in which spring force of tongue pieces of a spring will not be decreased, even in case where a larger tightening margin is provided between a cage and an outer race, but proper spring force can be maintained to attain reliable synchronization between the outer race and the cage, and a rise of cost will not be incurred.

The invention has been made in order to solve the above described problems, and the invention is a one-way clutch comprising a cage, a spring arranged along an inner diameter side of the cage, and a plurality of sprags inserted into respective pockets in the aforesaid cage and the aforesaid spring, the aforesaid cage being press fitted to an inner peripheral face of an outer race, characterized in that corrugated parts are formed in annular portions of the aforesaid spring, and rigidity of the spring is increased in a part of the spring at a position where the largest repulsive force is exerted from the aforesaid cage, by partly overlapping one end portion of the spring on the other end portion, and that positioning of the overlapped portion of the spring is conducted by means of the corrugated part formed in the annular portion of the spring and an edge of the other end portion.

The invention is characterized in that positioning of the overlapped portion of the aforesaid spring is conducted by means of the corrugated part formed in the annular portion of the spring and a bent portion formed at the edge of the other end portion so as to be curved along a round portion from a foot to a crest of the corrugated part.

BRIEF DESCRIPTION OF THE DRAWINGS

FIGS. 5A and 5B are views showing a modified embodiment of the overlapped portion of the spring employed in the one-way clutch of the invention;

Figure 1:
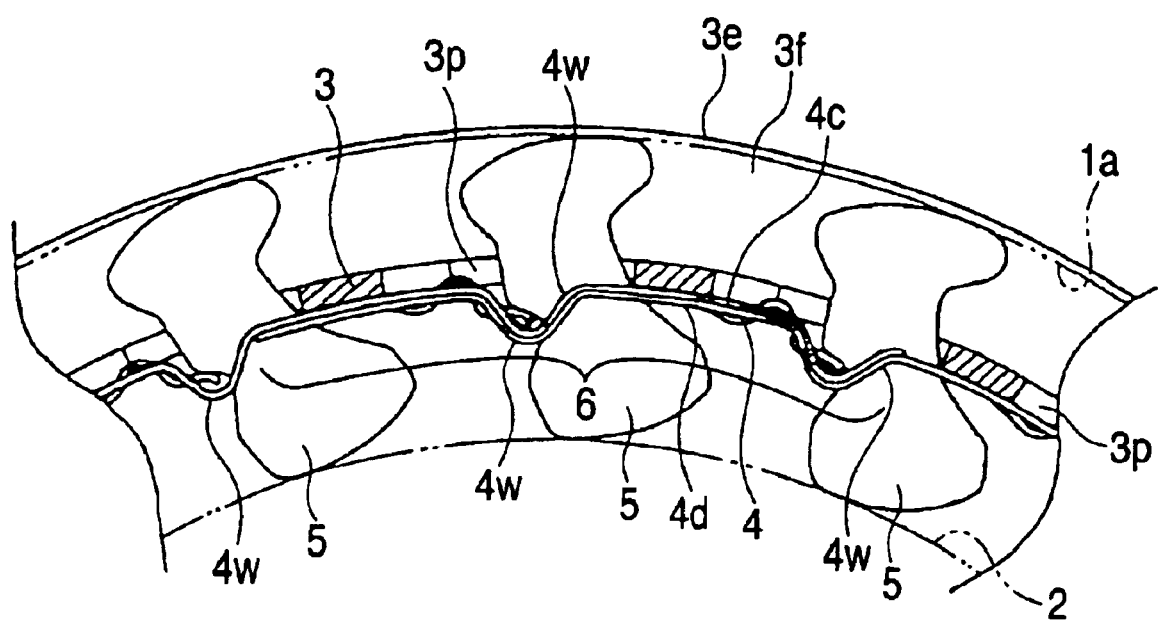
FIG. 1 is an enlarged side view of a part of a one-way clutch according to the invention.

In the figures, a reference numeral 1 refers to an outer race; 2 to an inner race; 3 to a cage; 3p to a pocket of cage; 4 to a spring; 4p to a pocket of spring; 5 to a sprag; and 6 to an overlapped portion of spring.

DETAILED DESCRIPTION OF THE PREFERRED EMBODIMENTS

Now, a specified embodiment of the invention will be described referring to the drawings.

Figure 2A:
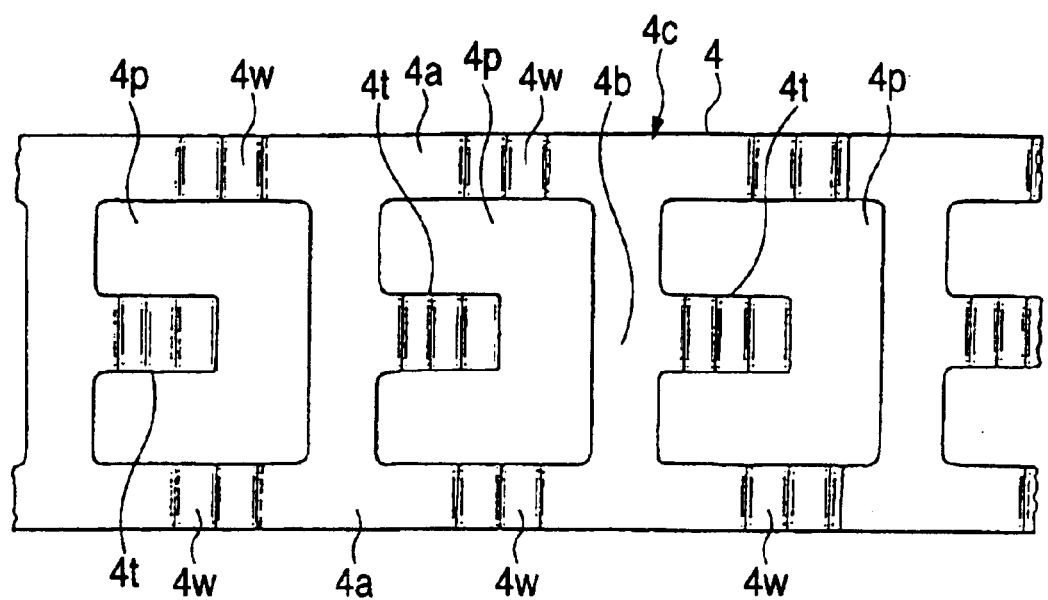
FIG. 2A is an enlarged plan view of a part of a spring constituting the invention.
Figure 2B:
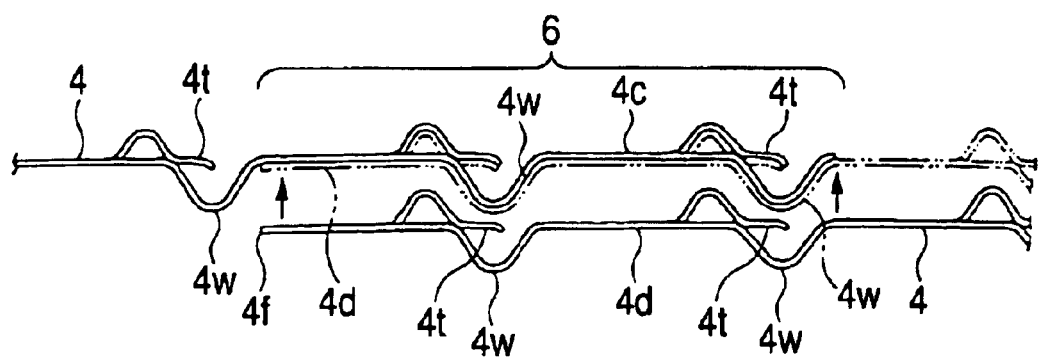
FIG. 2B is a side view of the part of the spring.
Figure 3:
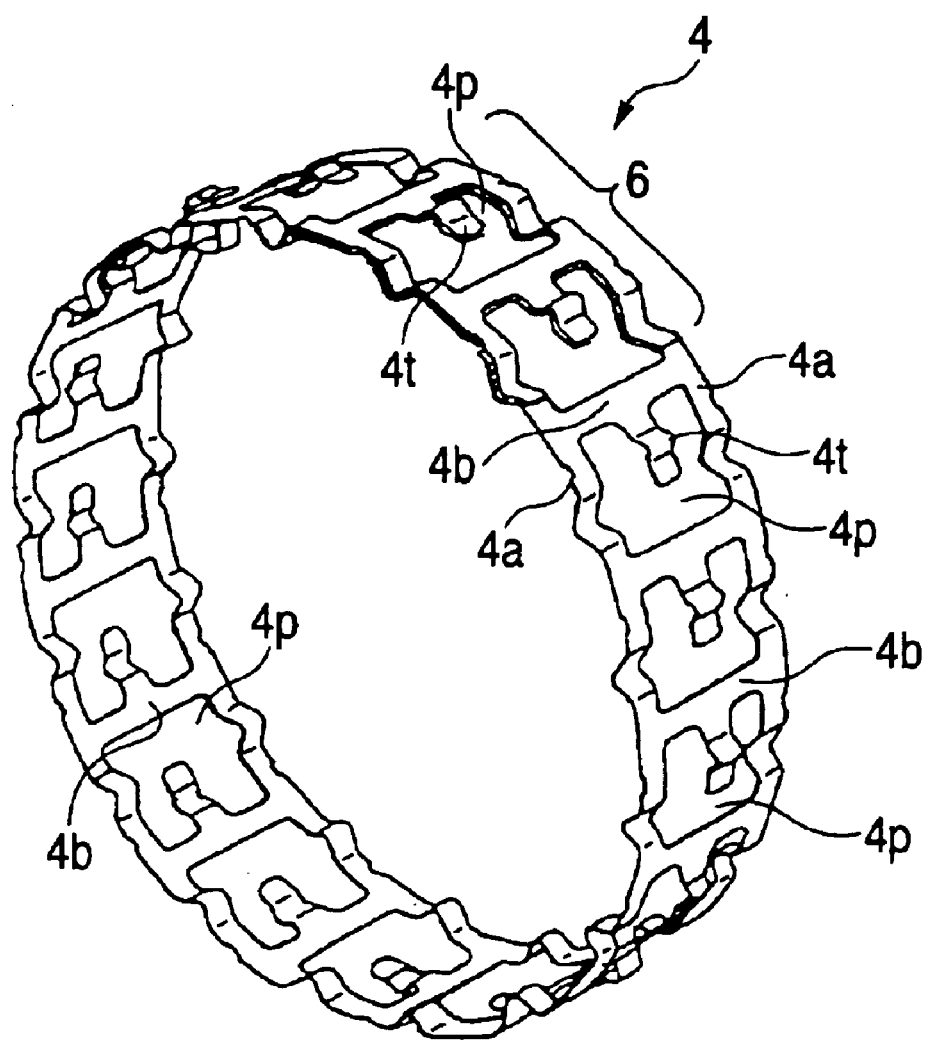
FIG. 3 is a perspective view of an entire structure of the spring which is employed in the invention.

FIG. 1 is an enlarged side view showing a part of a one-way clutch according to the invention, FIG. 2A is an enlarged plan view of a part of a spring constituting the one-way clutch of the invention, and FIG. 2B is a side view of the part of the spring. It is to be noted that FIG. 2A is shown in a developed state in a longitudinal direction for facility of understanding, and that FIG. 2B is shown in a state where one of overlapped portions is detached from the other. FIG. 3 is a perspective view showing an entire structure of the spring which is employed in the invention.

Figure 8:
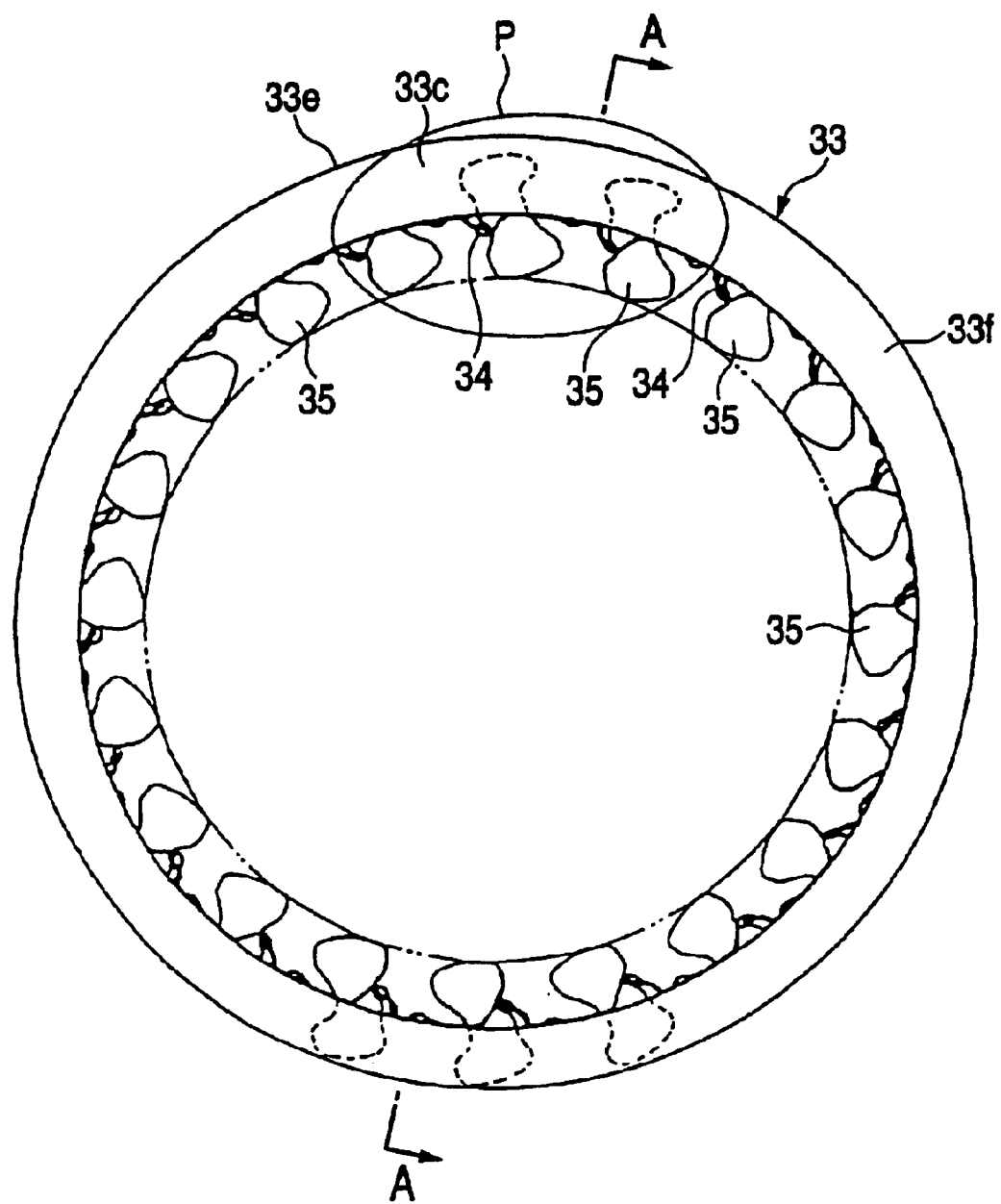
FIG. 8 is a side view showing a further example of the conventional one-way clutch.
Figure 9:
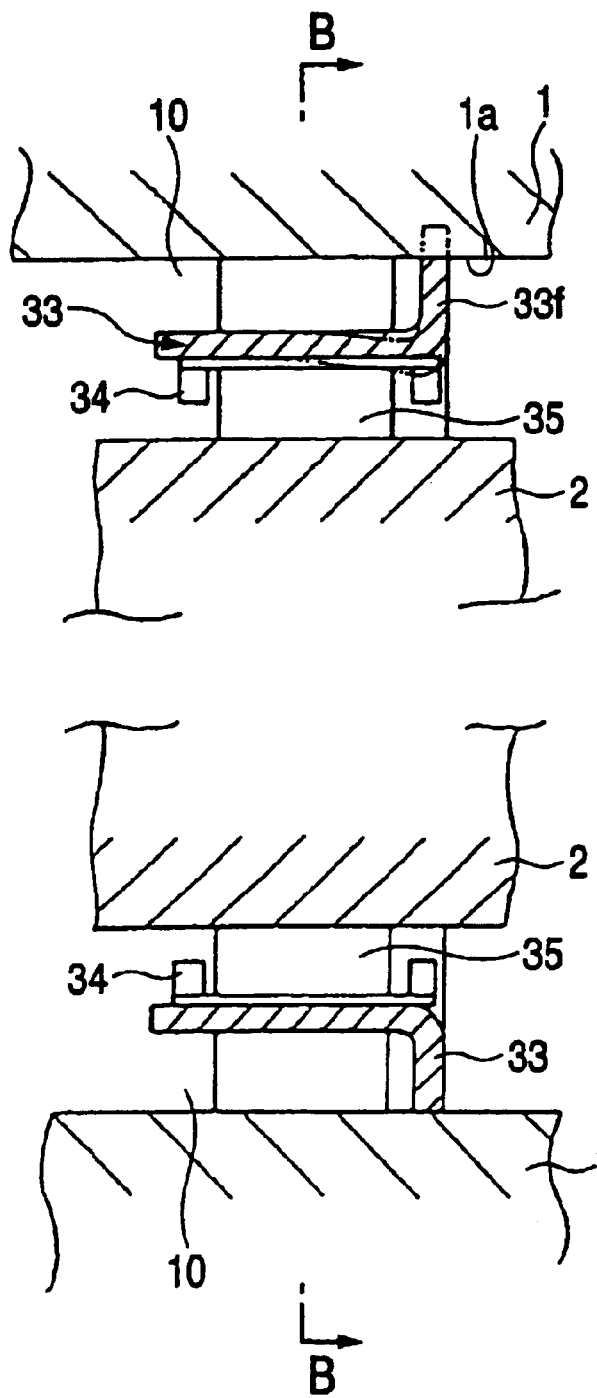
FIG. 9 is a sectional view as seen in a direction of arrows A—A in FIG. 8.
Figure 10:
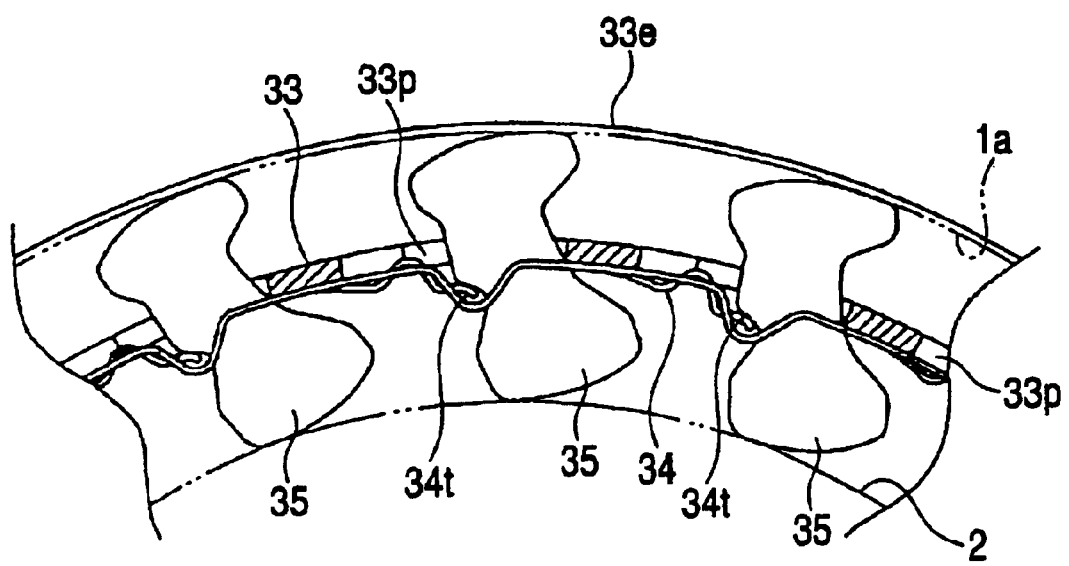
FIG. 10 is a sectional view as seen in a direction of arrows B—B in FIG. 8.

This one-way clutch includes a cage 3, a spring (a ribbon spring) 4 disposed along an inner diameter side of the cage 3, and a plurality of sprags 5, 5 . . . inserted into pockets 3p, 3p, . . . of the aforesaid cage 3. The one-way clutch is disposed in an annular space 10 between an outer race 1 and an inner race 2 (See FIG. 9). The aforesaid cage 3 is provided with a flange portion 3f at its one side. The flange portion 3f of the aforesaid cage 3 whose outer peripheral face 3e is press fitted to an inner peripheral face (a track face) 1a of the outer race 1 is partially formed in an elliptical shape (See an encircled part P in FIG. 8) so as to be reliably press fitted and secured. Although the following description will be made referring to a case in which a single cage 3 is employed, the invention can be also applied to the one-way clutch in which two cages, namely an outer cage and an inner cage are employed, as often used generally. Moreover, the aforesaid cage 3 may be provided with two flange portions at both sides thereof, but, in this case, an outer diameter of one of the flange portions should be smaller than an inner diameter of the outer race 1.

The aforesaid spring 4 has substantially the same shape as the cage 3 as shown in FIG. 3, and includes annular portions 4a, 4a at both sides, pillar portions 4b, interconnecting these annular portions (4a, 4a) at a constant interval in a circumferential direction, pockets 4p, 4p defined by these annular portions (4a, 4a) and the pillar portions 4b for positioning the sprags 5 therein, and tongue pieces 4t projected from the pillar portions 4b into the pockets 4p for urging the sprags 5. The spring 4 is made of a thin metal plate by stamping to form the annular portions 4a having a ring-like shape, and corrugated parts 4w, 4w, . . . are respectively formed in these annular portions 4a. And, smooth parts are also formed between the corrugated parts. In addition, as described below, a part of one end portion 4c of this spring 4 is overlapped on a part of the other end portion 4d to form an overlapped portion 6 so as to give an increased rigidity. The overlapped portion 6 reinforces the spring 4 against the largest repulsive force exerted from the cage 3.

As has been described also in "Description of the Related Art", when the flange portion 3f of the cage 3 is press fitted to the track face 1a of the outer race 1, the elliptical part of the flange portion 3f of the cage 3 has the largest tightening margin, and an amount of deformation of the cage 3 becomes larger locally in this area. Usually, in such a case, an amount of deformation of the spring 4 which is disposed along the inner diameter side of the cage 3 will be decreased. Accordingly, an amount of deformation of the tongue pieces 4t of the spring 4 which press the sprags 5 in a locking direction will be also decreased, and thus, pre-load applied to the sprags 5 by the tongue pieces 4t will be decreased. In order to avoid such phenomenon, one end portion 4c of the spring 4 is overlapped on the other end portion 4d to form the partly overlapped portion 6 as shown in FIGS. 1 and 2, thereby increasing the rigidity (spring force) of the spring 4 (In FIG. 2, the one end portion and the other end portion are shown in a detached state for convenience of explanation). When the rigidity (spring force) of the overlapped portion 6 has increased in this manner, it will be possible to ensure an amount of the pre-load acting on the sprags 5 to such an extent that the sprags 5 may not be inclined more than required, even though the amount of deformation in the elliptical part (the upper part in FIG. 8) of the cage 3 has increased and the amount of deformation of the tongue pieces 4t of the spring 4 has decreased. As the results, the sprags 5 will not be largely deformed in a direction of idle rotation, so that all the sprags 5 can be operated synchronously as usual, even when they are shifted from the position of idle rotation to the engaged position.

Figure 4A:
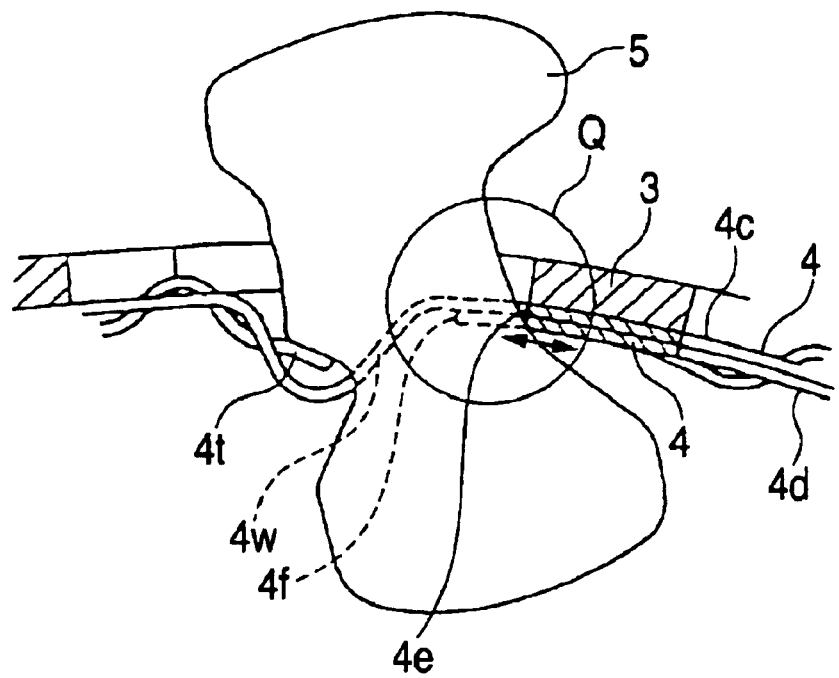
FIG. 4A is a side view of a part of the spring employed in the one-way clutch of the invention for explaining a position of an overlapped portion of the spring.
Figure 4B:
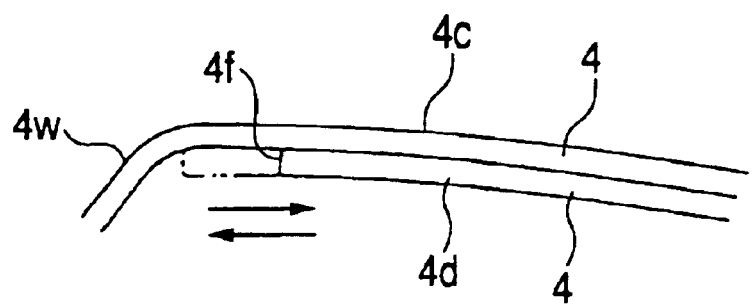
FIG. 4B is an enlarged view of an encircled part Q in FIG. 4A.
Figure 6:
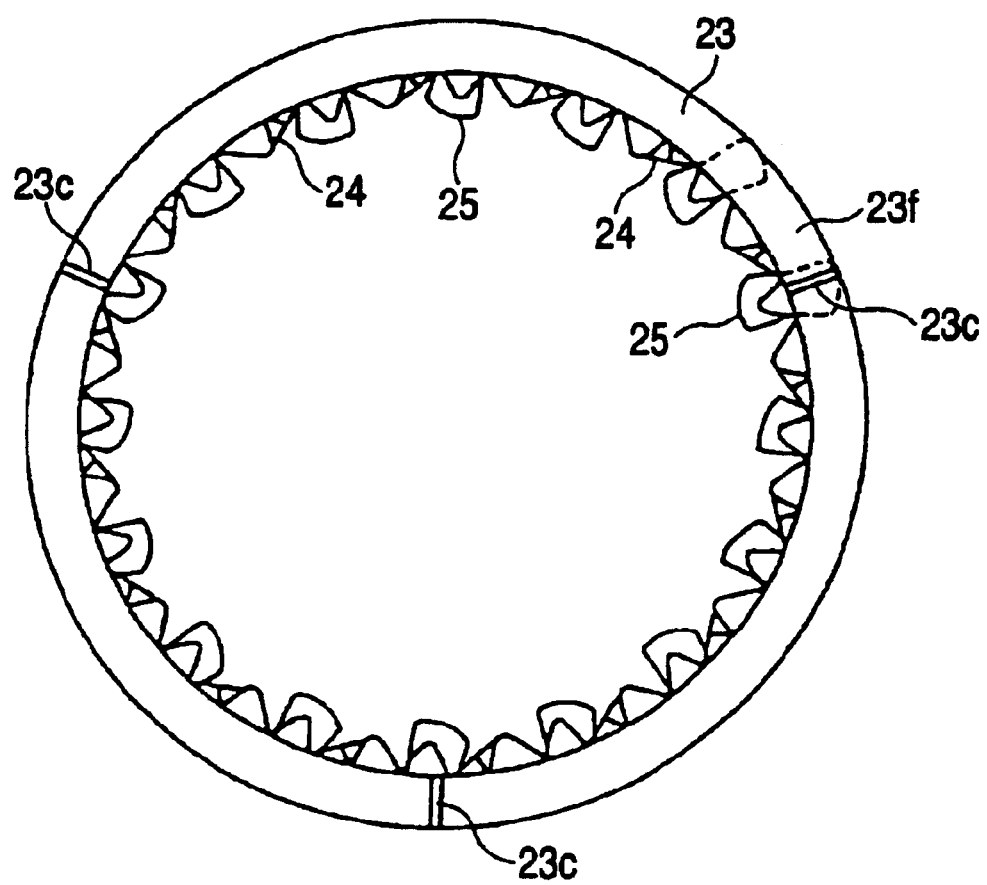
FIG. 6 is a view showing a structure of a conventional one-way clutch including sprags, a cage and a ribbon spring.
Figure 7:
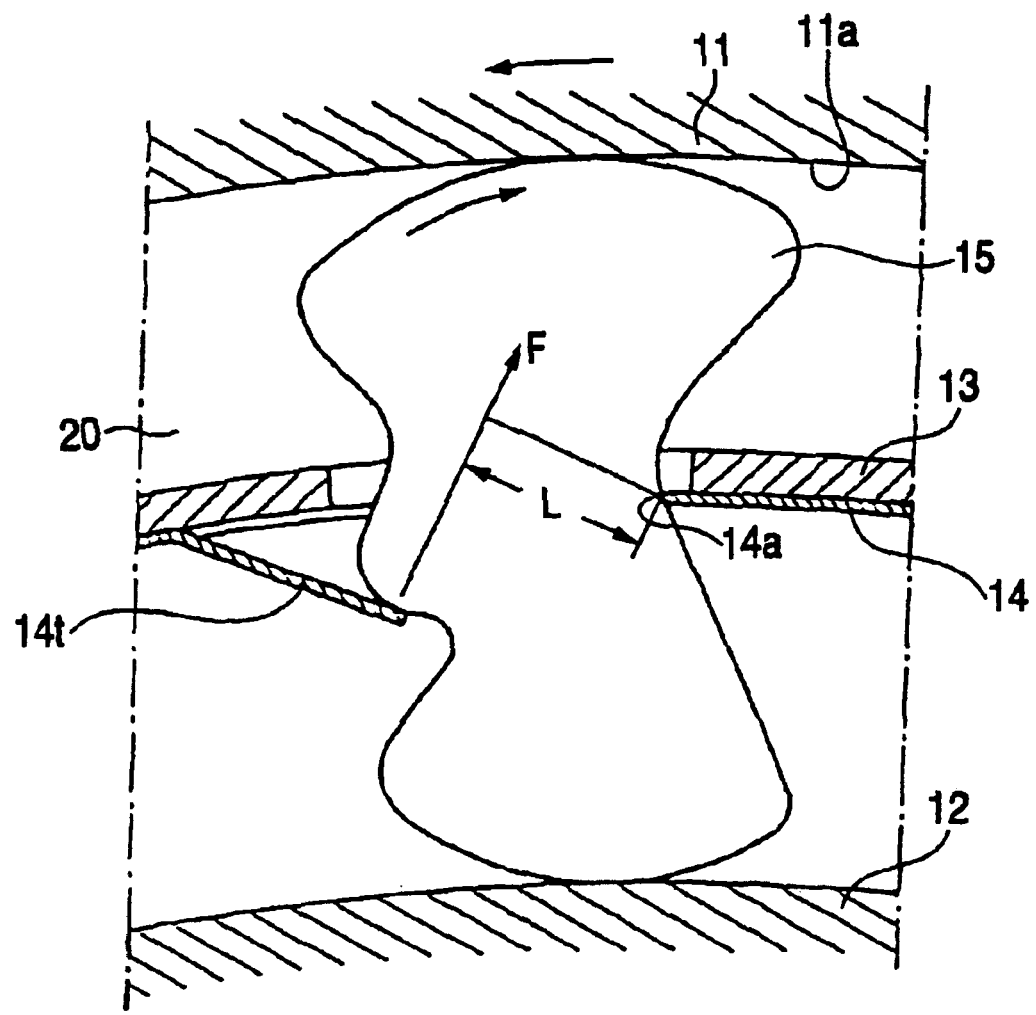
FIG. 7 is a side view showing another example of the conventional one-way clutch.

On occasion of providing the partly overlapped portion 6 by overlapping the one end portion 4c of the spring 4 on the other end portion 4d, in a state where an edge 4f of the other end portion 4d is locked to a halfway of the end portion 4c of the one annular portion 4a as shown in an encircled part Q of FIG. 4A, the end portion 4c and the end portion 4d are always somewhat moved by spring action as shown in FIG. 4B, because the spring 4 is liable to be elastically deformed by nature. Consequently, the edge 4f of the other end portion 4d can not be secured, but will become easy to move in an unstable state. When the end portion 4c and the end portion 4d have moved in this manner, positioning of the sprag 5 will be made at the overlapped edges 4e of the pocket 4p and the pocket 4p which are respectively formed in the end portion 4c and the end portion 4d located in the back of the sprag 5 (see the encircled part Q in FIG. 4A). Thus, the sprag 5 located on the overlapped portion 6 of the spring 4 will receive the spring force from the overlapped edges 4e of the pockets 4p of the spring 4 which has been wrapped, and cannot move in harmonization with the other sprags. Then, as compared with those sprags located in the other pockets of the spring, a compelling force will be exerted on this sprag, and engaging ability of this sprag will be deteriorated.

Under the circumstances, according to the invention, positioning of the overlapped portion 6 is conducted by abutting the edge 4f of the end portion 4d of the other annular portion 4a against a foot of the corrugated part 4w which is formed in the annular portion 4a of the one end portion 4c of the spring 4, as shown in FIGS. 1 and 2. By thus conducting the positioning of the overlapped portion 6 of the spring 4 by abutment between the wave-form part 4w formed in the annular portion 4a of the end portion 4c and the edge 4f of the end portion 4d of the other annular portion 4a, the sprag 5 located on the overlapped portion 6 of the spring will not receive a compelling force from the edges 4e of the pockets 4p. Therefore, this sprag 5 can achieve a favorable state of engagement in the same manner as those sprags 5 on the other positions of the spring 4.

FIGS. 5A and 5B are views showing a modified embodiment for positioning the overlapped portion 6 of the spring 4. Specifically, the overlapped portion 6 of the spring 4 is stabilized by abutting the edge 4f of the end portion 4d of the other annular portion 4a against the foot of the corrugated part 4w which is formed in the annular portion 4a of the one end portion 4c of the spring 4, as described above. However, in this embodiment, the edge 4f of the other end portion 4d is further curved along a Round portion at the foot of the corrugated part 4w of the one end portion 4c of the annular portion 4a of the spring 4 up to a halfway thereof. By thus forming a bent portion in the edge 4f of the other end portion 4d so as to be curved along a crest of the corrugated part 4w of the one end portion 4c up to a halfway of the Round portion at the foot thereof, the overlapped portion 6 will be stabilized, and the back face of the sprag 5 will be free from the compelling force which is exerted from the edges 4e of the pockets 4p due to the overlapping of the spring 4. Accordingly, it will be possible to ensure a favorable state of engagement of the sprag 5.

As described in detail herein above, according to is the one-way clutch of this invention, it is possible to reinforce the spring force of the tongue piece of the ribbon spring which is located at the position where the largest tightening margin is provided between the cage and the outer race. Moreover, because the sprag located on the overlapped portion of the spring will not be affected by the compelling force from the pockets, the sprag can be positioned in a stabilized state, and a favorable state of engagement can be always maintained.

What is claimed is:

1. A one-way clutch comprising:
   a cage press fitted to an inner peripheral face of an outer race;
   a spring arranged along an inner diameter side of said cage and comprising pockets and annular portions comprising corrugated parts; and
   a sprag assembly comprising a plurality of sprags, wherein said sprags are inserted into respective pockets of said spring and into said cage;
   wherein, at a position where a largest repulsive force is exerted from said cage to said spring, an overlapped portion is formed by one end portion of said spring overlapping the other end portion of said spring so that rigidity of said spring is increased,
   wherein said overlapped portion of said spring is positioned by one of said corrugated parts at the one end portion of said spring and an edge portion of the other end portion of said spring, and
   wherein the repulsive force exerted by said cage to said spring varies with respect to position.

2. The one-way clutch according to claim 1, wherein a bent portion is formed in said edge portion of the other end portion of said spring so as to be curved along a round portion from a foot to a crest of said corrugated part, and said bent portion and said corrugated part define a position of said overlapped portion of said spring.

3. The one-way clutch of claim 1, wherein said edge portion of the other end portion is positioned against a foot of said corrugated part at the one end portion.

4. The one-way clutch of claim 3, wherein said edge portion is further curved along a round portion of the foot of the corrugated part.

5. The clutch of claim 4, wherein the one end of the spring comprises a bent portion.

6. The clutch of claim 4, wherein the foot of the corrugated part defines an intersection between the corrugated part and a smooth part of the spring.

7. The clutch of claim 6, wherein the spring further comprises a tongue that rotationally biases the sprag.

8. The clutch of claim 3, wherein the spring comprises:
   a corrugated part;
   a smooth part; and
   one end of the spring abuts a foot of the corrugated part.

9. The clutch of claim 3, wherein the cage comprises an elliptical shape as a result of being press fit into the inner peripheral face of the outer race.

10. The clutch of claim 3, wherein the spring and the cage define a pocket.

11. The clutch of claim 3, further comprising an inner race positioned inside the spring.

12. The one-way clutch of claim 1, wherein the cage comprises an elliptical shape.

13. The clutch of claim 12, wherein the bent portion comprises a curve that matches a curve in the foot of the corrugated part.

14. The clutch of claim 13, further comprising a sprag in the pocket.

15. A one-way clutch comprising:
   a cage press fitted to an inner peripheral face of an outer race;
   a spring arranged along an inner diameter side of said cage, said spring comprising pockets and annular portions comprising corrugated parts and smooth parts;
   a sprag assembly comprising a plurality of sprags, said each sprag is inserted into a pocket of said spring and a pocket of said cage, respectively; and
   an overlapped portion provided on said spring at a position where a largest repulsive force is exerted from said cage to the spring, and formed by a first end of said spring that overlaps with a second end of said spring;
   wherein, at said overlapped portion, an edge portion of said second end extends to at least a boundary between said corrugated part and said smooth part, and
   wherein the repulsive force exerted by said cage to said spring varies with respect to position.

16. The one-way clutch according to claim 15, wherein said edge portion of the second end of said spring fits into a curve in said spring between said smooth part and said corrugated part.

* * * * *